United States Patent Office 3,459,864
Patented Aug. 5, 1969

3,459,864
N⁶-BENZYL AND ALKYL URETHANE DERIVA-
TIVES OF BENZYL AND ALKYL ESTERS OF
LYSINE IN COMPOSITIONS AND METHODS
FOR TREATING INFLAMMATION
Albert Johl, Basel, Switzerland, Albert Hartmann, Grenz-
ach, Germany, and Hans Rink, Riehen, Switzerland,
assignors to Geigy Chemical Corporation, Greenburgh,
New York, a corporation of Delaware
No Drawing. Filed Feb. 21, 1966, Ser. No. 528,827
Claims priority, application Switzerland, Feb. 25, 1965,
2,579/65
Int. Cl. A61k 27/00
U.S. Cl. 424—300
5 Claims

ABSTRACT OF THE DISCLOSURE

N⁶-benzyl and alkyl urethane derivatives of benzyl and alkyl esters of lysine are anti-inflammatory agents.

Detailed description

The present invention concerns new pharmaceutical agents having in particular anti-inflammatory and antiallergic activity as well as the use thereof.

It has been found that, surprisingly, lysine derivatives which are of the formula

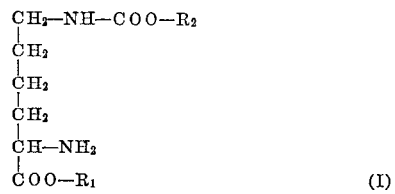

wherein $R_1$ and $R_2$ represent alkyl of at most 12 carbon atoms, benzyl or lower alkyl-substituted benzyl of at most 12 carbon atoms, in their DL-, D- and L-form or their pharmaceutically acceptable salts with inorganic or organic acids, have excellent anti-allergic and anti-inflammatory activity and, at the same time, high therapeutic indices.

Because of their antiallergic and anti-inflammatory activity, the compounds of Formula I and their pharmaceutically acceptable acid addition salts are suitable as active substances of medicaments for the treatment of allergic diseases and for the protection of transplants or the treatment of inflammatory conditions of various origins such as rheumatic diseases, post-traumatic and post operative inflammation and swelling, inflammation of the blood vessels and lymphatics, as well as—in addition to antibiotics or chemotherapeutics—bacterial or viral infections.

The antiallergic and anti-inflammatory activities have been demonstrated in standard pharmacological tests, e.g. on the rat and guinea pig.

Agents according to the invention for the treatment of allergies and inflammation of various origin contain, as active ingredients, compounds of Formula I or at least one pharmaceutically acceptable salt of such a compound in a form suitable for oral, rectal or parenteral administration. In the compounds of Formula I, $R_1$ and $R_2$, for example, represent the methyl, ethyl, propyl, isopropyl, butyl, sec. butyl, isobutyl, tert. butyl, pentyl, isopentyl, 1,2-dimethyl-propyl, etc. up to the dodecyl group or the benzyl group; the benzene ring can be substituted in o-, m- and/or p-position by lower alkyl, preferably by methyl, ethyl, propyl, isopropyl or butyl.

Suitable pharmaceutically acceptable salts are those with inorganic and organic acids; they are well tolerated when applied in the usual dosages; more particularly, salts which can be used as active substances instead of the free bases are, e.g. the salts with hydrochloric acid, hydrobromic acid, sulfuric acid, phosphoric acid, methane sulfonic acid, ethane sulfonic acid, β-hydroxyethane sulfonic acid, acetic acid, lactic acid, oxalic acid, succinic acid, fumaric acid, maleic acid, malic acid, tartaric acid, citric acid, benzoic acid, salicyclic acid, phenylacetic acid, mandelic acid and embonic acid.

Such salts are produced, e.g. by reacting the compounds of Formula I with the equivalent amount of the acid desired in a suitable organic or aqueous-organic solvent such as methanol, ethanol, diethyl ether, chloroform or methylene chloride.

The active substances are administered orally, rectally and parenterally. The daily dosages of the free bases or of non-toxic salts thereof vary between 10 and 800 mg. for adult patients of normal weight. Suitable dosage units such as dragées (sugar coated tablets), tablets, suppositories or ampoules, preferably contain 5–50 mg. of an active substance according to the invention or a non-toxic salt thereof.

Dosage units for peroral administration preferably contain between 1% and 90% of a compound of the general Formula I or of a non-toxic salt thereof as active substance. They are produced by combining the active substance, for example, with solid pulverulent carriers such as lactose, saccharose, sorbitol, mannitol; starches such as potato starch, maize starch or amylopectin, also laminaria powder or citrus pulp powder; cellulose derivatives, or gelatines, optionally with the addition of lubricants such as magnesium or calcium stearate or polyethylene glycols (Carbowaxes) of suitable molecular weights to form tablets or dragee cores. The latter are coated, e.g. with concentrated sugar solutions which can also contain, for example, gum arabic, talcum and/or titanium dioxide, or with a lacquer dissolved in easily volatile organic solvents or mixtures of solvents. Dyestuffs can be added to these coatings e.g. to distinguish between varying dosages of active substance.

Examples of dosage units for rectal administration are suppositories which consist of a combination of an active substance or a suitable salt thereof with a basis of a neutral fat, or also gelatine rectal capsules which contain a combination of the active substance or a suitable salt thereof with polyethylene glycols (Carbowaxes) of suitable molecular weight.

Dry ampoules for the preparation of, preferably, 0.5–5% aqueous solutions for parenteral, particularly intravenous, intramuscular or subcutaneous administration contain a water soluble, non-toxic salt of an ester of the general Formula I, optionally together with suitable stabilising agents and buffer substances.

To produce a compound of the general Formula I or salts thereof, a compound of the general Formula II

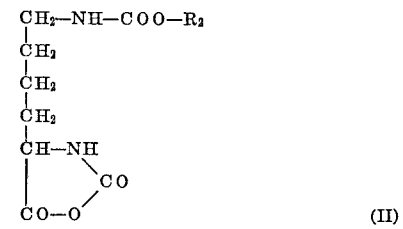

wherein $R_2$ has the meaning given in Formula I, is reacted with an alkanol or benzyl alcohol of the general Formula III

wherein $R_1$ has the meaning given in Formula I in the presence of an acid, and if desired, the ester obtained is converted into a salt with another inorganic or organic acid or into the free base. The reaction is preferably performed with the aid of a strong mineral acid such as hydrochloric acid or concentrated sulphuric acid. An excess of the alcohol and/or an inert solvent is used as solvent. Suitable inert solvents are, e.g. hydrocarbons such as absolute benzene or toluene, or ethereal liquids such as dioxan or absolute diethyl ether.

Starting materials, i.e. anhydrides of the general Formula II, have been described in the literature. They are produced, e.g. by reacting $N^2$-benzyloxycarbonyl-$N^6$-alkoxy-carbonyl-lysine or $N^2,N^6$-bis-benzyloxycarbonyl-lysine with thionyl chloride in diethyl ether.

Preferably the reaction mixture is reacted with an alcohol of the general Formula III without isolating the anhydride. Examples of such starting materials are compounds of the general Formula II, the substituent $R_2$ of which has the definition given above for that radical.

According to a second process for the production of a compound of general Formula I, an amino acid of the general Formula IV

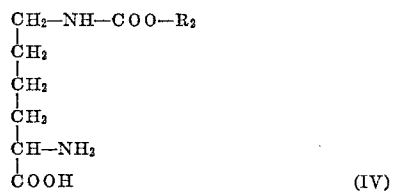

(IV)

wherein $R_2$ has the meaning given in Formula I, or a reactive derivative of such an acid, is converted in the known way into an alkyl or benzyl ester and, if desired, the ester obtained is converted into a salt with an inorganic or organic acid.

For example, an acid of the general Formula IV or a reactive functional derivative thereof is reacted with an alkanol or benzyl alcohol of the general Formula III wherein $R_1$ has the meaning given in Formula I. This reaction of the free carboxylic acid can be performed, e.g. with the aid of a mineral acid such as hydrochloric acid or concentrated sulphuric acid, an aromatic sulphonic acid such as p-toluene or benzene sulphonic acid, and also with the aid of thionyl chloride or sulphuryl chloride. As solvent, an excess of the alcohol and/or an inert solvent is used. Suitable inert solvents are, e.g. hydrocarbons such as benzene or toluene as well as chlorinated hydrocarbons such as chloroform and carbon tetrachloride. If water is split off during the reaction, this is preferably removed by azeotropic distillation.

Also a low ester such as the methyl or ethyl ester can be reacted instead of the free acid of the general Formula IV with an alkanol or benzyl alcohol of general Formula III. This transesterification is preferably performed in excess alcohol in the presence of a catalyst such as sodium methylate or aluminium isopropylate.

Those compounds are suitable starting materials of the general Formula III whose $R_1$ substituent has the definition given above for this radical.

According to another variation of this process, an acid of the general Formula IV or a salt of such an acid is reacted with a reactive ester of an alkanol or benzyl alcohol of the general Formula III. Alkali metal salts such as sodium and potassium salts or salts of organic bases such as pyridine, triethylamine or dicyclohexylethylamine are suitable as salts of such acids and, as reactive esters of alcohols of the general Formula III, halides such as bromides or chlorides, carboxylic acid esters such as acetates, also sulphates, sulphites, benzene or toluene sulphonic acid esters are suitable. Halides and sulphates are preferably reacted with the salts mentioned and acetates or sulphites are preferably reacted with the corresponding free acids of the general Formula IV. The reaction of the acetates and sulphites can be carried out, e.g. with the aid of benzene or p-toluene sulphonic acid or perchloric acid.

In addition, an acid of the general Formula IV can be esterified with an alkylene which is disubstituted at a carbon atom carrying a double bond. The reaction is performed, e.g. with the aid of a strong mineral acid such as concentrated sulphuric acid, in an inert solvent. Examples of suitable solvents are chlorinated hydrocarbons such as methylene chloride, glycols such as ethylene glycol, ethereal liquids such as dioxan or ethylene glycol dimethyl ether.

In addition, an acid of the general Formula IV can also be esterified with a diazo alkane or an α-diazo toluene. The reaction is preferably performed in a solvent. Solvents which can be used are, e.g. ethereal liquids such as diethyl ether or dioxan. Examples of diazo alkanes or α-diazo toluenes are diazomethane and α-diazo toluene.

Suitable starting materials of the general Formula IV are, for example, those substituted according to the definition of $R_2$ above. Such starting materials, e.g. $N^6$-methoxycarbonyl-L-lysine and $N^6$-benzyloxycarbonyl-L-lysine, have been described in the literature; others can be produced analogously.

According to a third process a compound of general Formula I is produced by partially hydrolysing or reductively cleaving a compound of the general Formula V.

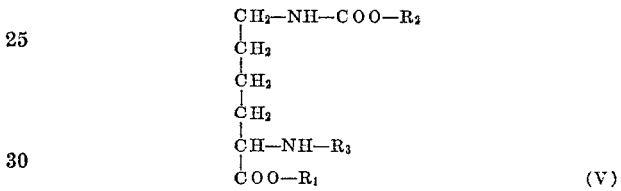

(V)

wherein $R_1$ and $R_2$ have the meanings given in Formula I, and $R_3$ represents a mono- or polyarylmethyl or a carboxylic acid radical, a radical of a monofunctional derivative of carbonic acid or the p-tolyl sulphonyl radical, and if desired, converting the compound obtained into a salt with an inorganic or organic acid.

As polyaryl methyl radical, the substituent $R_3$ can be, e.g. the trityl radical which can be removed by hydrolysis or reduction. The hydrolysis can be performed, e.g. with the aid of dilute acetic acid or hydrochloric acid, optionally in a low alkanol such as ethanol, or a low ketone such as acetone, as solvent. The reduction can be performed with hydrogen in a low alkanol such as methanol in the presence of a catalyst such as palladium charcoal or Raney nickel.

As carboxylic acid radical, the substituent $R_3$ can be, e.g. the trifluoroacetyl radical which can be hydrolysed with the aid of a dilute alkaline medium whose pH is above 10, in the presence or absence of an organic solvent, e.g. a low alkanol such as methanol or ethanol. In addition, the substituent $R_3$, as carbonic acid radical, can be, e.g. the tert. butoxycarbonyl or benzyloxycarbonyl radical, both of which can be removed by acid catalysed solvolysis, for example, with the aid of hydrochloric or hydrobromic acid, preferably in a solvent. Among others, suitable solvents are carboxylic acids such as acetic acid or trifluoroacetic acid, chlorinated hydrocarbons such as carbon tetrachloride, and ethereal liquids such as dioxan, or alcohols such as ethanol.

The benzyloxycarbonyl group can also be removed by reduction, e.g. with hydrogen in a low alkanol such as methanol, in the presence of a catalyst such as palladium charcoal or Raney nickel. If the substituent $R_3$ is the p-tolyl sulphonyl group, this can be removed by means of sodium in liquid ammonia or with hydrobromic acid and phenol in glacial acetic acid.

The following examples further illustrate the production of tablets and dragées usable according to the invention and the production of new compounds. The temperatures are given in degrees centigrade.

Example 1

250 g. of $N^6$-benzyloxycarbonyl-L-lysine methyl ester hydrochloride are mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 2.50 g. of magnesium stearate and 32 g. of colloidal silicium dioxide are mixed in and the mixture is pressed into 10,000 tablets each weighing 100 mg. and containing 25 mg. of active substance (hydrochloride). If desired, the tablets can be grooved for better adaptation of the dosage.

A similar composition is obtained by employing in lieu of $N^6$-benzyloxycarbonyl-L-lysine methyl ester hydrochloride, 250 g. of $N^6$-benzyloxycarbonyl-L-lysine benzyl ester hydrochloride.

Example 2

A granulate is produced from 250 g. of $N^6$-benzyloxycarbonyl-L-lysine dodecyl ester hydrochloride, 175.90 g. of lactose and the alcoholic solution of 10 g. of stearic acid. After drying, the granulate is mixed with 56.60 g. of colloidal silicium dioxide, 165 g. of talcum, 20 g. of potato starch and 2.50 g. of magnesium stearate and pressed into 10,000 dragée cores. These are then coated with a concentrated syrup made from 522.28 g. of crystallised saccharose, 6 g. of shellac, 10 g. of gum arabic, 215 g. of talcum, 15 g. of colloidal silicium dioxide, 0.22 g. of dyestuff and 1.5 g. of titanium dioxide and dried. The dragées obtained each weigh 145 mg. and contain 25 mg. of active substance.

Example 3

(a) 6.55 g. of thionyl chloride (55 millimol) are added dropwise to 30 ml. of methanol, chilled to $-10°$. 12.3 g. of $N^6$-isobutoxy-carbonyl-L-lysine (50 millimol) are then added in portions with stirring at $-5$ to $-10°$. The resultant clear solution is left until it attains a temperature of 20°. The temperature is then raised to 40°. After 5 hours at this temperature the solvent is evaporated in vacuo. In order to remove the sulphur dioxide and excess hydrochloric acid, the oily residue is dissolved several times in methanol and the methanol evaporated in vacuo. The residue is crystallised from methanol/diethyl ether. The crude hydrochloride is purified by dissolving 13.8 g. thereof in 100 ml. of water, and adding 46.5 ml. of 1 N sodium hydroxide while cooling. The free base is extracted from the aqueous solution with ethyl acetate, the organic phase washed with water and dried over sodium sulphate. After concentrating the solution in vacuo, the hydrochloride is precipitated by the addition of 38.3 ml. of 1.21 N ethereal hydrochloric acid, filtered, washed with diethyl ether and dried in vacuo. The $N^6$-isobutoxycarbonyl-L-lysine methyl ester hydrochloride is recrystallised twice from methanol/ethyl acetate/diethyl ether whereupon it melts at 124–126°, $[\alpha]_D^{22°}+18.0°$ (c.=2.04 in methanol).

(b) $N^6$-isobutoxycarbonyl-L-lysine benzyl ester hydrochloride is produced analogously to (a) from $N^6$-isobutoxycarbonyl-L-lysine and benzyl alcohol. It melts at 105–106° (from methanol/acetonitrile/ethyl acetate), $[\alpha]_D^{22°}-2.5°$ (c.=2.01 in methanol).

(c) $N^6$-isobutoxycarbonyl-L-lysine 4-methyl-benzyl ester hydrochloride is produced analogously to (b) but using p-methyl-benzyl alcohol in lieu of benzyl alcohol.

(d) $N^6$-(p-isopropyl-benzyloxy)-carbonyl-L-lysine methyl ester hydrochloride is produced analogously to (a) but using in lieu of $N^6$-isobutoxycarbonyl-L-lysine an equimolar amount of $N^6$-(p-isopropyl-benzyloxy)-carbonyl-L-lysine.

(e) The starting material used in (a), (b) and (c) is produced as follows:

80 g. of L-lysine hydrochloride (0.44 mol) are dissolved in 640 ml. of water, 80 g. of basic copper carbonate, 2 $CuCO_3$, $Cu(OH)_2$, are added and the reaction mixture refluxed for 30 minutes. The excess copper carbonate is then removed by filtration. To the vigorously stirred deep blue filtrate, cooled to 0°, 120 g., of isobutyl chloroformate (0.88 mol) are added dropwise within 1 hour and the mixture stirred for 5 hours at 0°. During the reaction the pH is maintained at 7.5–8 by the addition of solid sodium carbonate. The precipitated copper complex of $N^6$-isobutoxycarbonyl-L-lysine is collected on a filter, washed thoroughly with water and methanol and dried in vacuo.

91.0 g. of the copper complex are suspended in 1 litre of water and dissolved by the addition of 250 ml. of 6 N hydrochloric acid. A stream of hydrogen sulphide is then passed into the cooled solution for 45 minutes. The excess hydrogen sulphide is removed by a vigorous stream of air. The copper sulphide is filtered and washed with water. The pH of the colourless filtrate is adjusted to 6 with concentrated aqueous ammonia whereupon the crude product precipitates. After standing for 3 hours at 0°, it is collected on a filter, washed well with water and ethanol and dried in vacuo. The $N^6$-isobutoxycarbonyl-L-lysine is crystallised from water/ethanol 1:1, M.P. 236–238° with decomposition, $[\alpha]_D^{23°}+17.6°$ (c.=2.04 in 1 N hydrochloric acid).

(f) The starting material used in (d) is produced analogously to (e), but using p-isopropylbenzyl chloroformate in lieu of isobutyl chloroformate.

Example 4

To a solution of 20.7 g. of $N^2$, $N^6$-bisbenzyloxycarbonyl-DL-lysine (50 millimol) in 330 ml. of anhydrous benzene, 9.2 ml. of thionyl chloride are added dropwise with stirring over a 20-minute period. During the addition the temperature was maintained at 20°. After 5 hours at 40°, 120 ml. anhydrous methanol are added within 10 minutes at 0–+5°. The reaction mixture is then allowed to stand at 20° for 20 hours. To work up, the solvents are removed in vacuo, the residue dissolved in methanol several times and the solution evaporated in vacuo in order to remove the sulphur dioxide and excess hydrochloric acid. The residue is then crystallised from methanol/diethyl ether. The crystals are filtered, washed with diethyl ether and dissolved in 50 ml. of water. 100 ml. of 5% sodium carbonate are added to the solution of the hydrochloride. The free base is extracted with diethyl ether, the ethereal extract washed with water, dried over sodium sulphate and concentrated. The hydrochloride is precipitated from the concentrated solution with 50 ml. of 1 N ethereal hydrochloric acid. It is recrystallised from chloroform/diethyl ether, from acetonitrile and methanol/diethyl ether.

The pure $N^6$-benzyloxycarbonyl-DL-lysine methyl ester obtained sinters at 104° and melts at 107–109°

Example 5

9.2 ml. (128 millimol) of thionyl chloride are added dropwise within 40 minutes at $-10°$ to a stirred suspension of 20.7 g. (50 millimol) of $N^2,N^6$-bisbenzyloxycarbonyl-L-lysine in 125 ml. of anhydrous diethyl ether. The mixture is kept for 30 minutes at 20° and then refluxed for 4 hours. During the reaction $N^6$-benzyloxycarbonyl-L-lysine $N^2$-carboxyanhydride crystallises from the solution.

To the crude reaction mixture 100 ml. of dry isopropanol are slowly added at 10° and the reaction allowed to proceed for 20 hours at 20°. To work up, the clear solution is concentrated at 30° in vacuo until crystallisation begins. The mixture is cooled to 20° and 300 ml. of diethyl ether are added. The crystals are collected, washed with diethyl ether and dissolved in 50 ml. of water. 100 ml. of 5% sodium hydrogen carbonate are added while cooling with ice. The free base which precipitates as an oil is extracted with diethyl ether, the ethereal solution is washed with water and dried over sodium sulphate. The hydrochloride is precipitated therefrom with an excess of ethereal hydrochloric acid. After recrystallising it twice from chloroform/diethyl ether, the $N^6$-benzyloxycarbonyl-L-lysine isopropyl ester hydrochloride decomposes at 154–156°, $[\alpha]_D^{24°} + 11.6°$ (c.=2.03 in ethanol), $[\alpha]_D^{24°} + 10.3°$ (c.=2.09 in water).

Example 6

The suspension of the crude $N^6$-benzyloxycarbonyl-L-lysine $N^2$-carboxyanhydride is produced analogously to Example 5 from 20.7 g. of $N^2,N^6$-bisbenzyloxycarbonyl-L-lysine. 100 ml. of distilled dodecyl alcohol are added to this suspension within 20 minutes at 20°. The reaction mixture is then refluxed for 1 hour. The resulting clear solution is allowed to stand for 15 hours at 20° and then cooled to 0°, whereupon it crystallises. The precipitated crystals are filtered, washed with diethyl ether and recrystallised from chloroform/diethyl ether, from acetone and from acetonitrile. The hydrochloride of $N^6$-benzyloxycarbonyl-L-lysine dodecyl ester sinters at 95° and decomposes at 97–98°. $[\alpha]_D^{24°} + 6.6°$ (c.=1.99 in ethanol), $[\alpha]_D^{24°} + 5.5°$ (c.=2.07 in water).

Example 7

27.2 ml. (0.375 mol) of thionyl chloride are added dropwise within 15 minutes to 730 ml. (8 mol) of n-butanol at −10°. 45.2 g. (0.15 mol) of finely pulverized $N^6$-benzyloxycarbonyl-L-lysine are added to the vigorously stirred solution. The reaction mixture is then left until it has reached room temperature, whereupon it is heated for 7 hours at 50°.

The product is worked up by concentrating the reaction solution in vacuo at 30°. Sulfur dioxide and hydrochloric acid are removed from the oil obtained by repeatedly dissolving it in methanol and evaporating the solvent in vacuo. Finally, benzene and petroleum ether are added to the residue and after each addition the solvent is removed in vacuo, whereupon the reaction product crystallizes. The crystalline residue is purified by two crystallizations from acetonitrile/diethyl ether. The pure $N^6$-benzyloxycarbonyl-L-lysine n-butyl ester hydrochloride melts at 130–132°. $[\alpha]_D^{23°} + 9.9°$ (c.=1.07 in water); $[\alpha]_D^{23°} + 9.7°$ (c.=1.92 in methanol).

We claim:

1. A composition selected from the group consisting of solid peroral dosage units, suppositories and dry ampoules comprising
(a) an anti-inflammatory amount of a lysine ester or a pharmaceutically acceptable salt thereof, the lysine ester being of the formula:

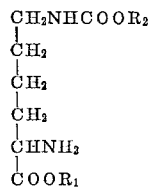

wherein each of $R_1$ and $R_2$ is alkyl of from 1 to 12 carbon atoms, benzyl or lower alkyl substituted benzyl of up to 12 carbon atoms, and
(b) a pharmaceutically acceptable carrier compatible with the lysine ester.

2. A composition as defined in claim 1, wherein $R_1$ is benzyl and $R_2$ is methyl.

3. A composition as defined in claim 1, wherein said lysine derivative is $N^6$-benzyloxycarbonyl-lysine methyl ester hydrochloride.

4. A method of treating inflammation comprising the administration to a patient of an inflammation-reducing amount of a lysine derivative selected from the group consisting of a compound of the formula

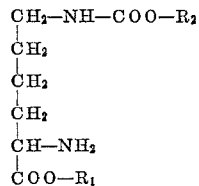

wherein each of $R_1$ and $R_2$ represents alkyl of from 1 to 12 carbon atoms, benzyl or lower alkyl-substituted benzyl of at most 12 carbon atoms, and a pharmaceutically acceptable addition salt of such a compound with an acid.

5. The method of claim 4 wherein the inflammation is of allergenic origin.

References Cited

Erlander et al.: J. A. C. S., vol. 73, August 1951, pp. 4025–4027.

ALBERT T. MEYERS, Primary Examiner

S. FRIEDMAN, Assistant Examiner